United States Patent
Hong (10) Patent No.: US 12,520,293 B2
(45) Date of Patent: Jan. 6, 2026

(54) METHOD AND SYSTEM TO REPORT MEASUREMENT INFORMATION MEASURED BASED ON A REFERENCE SIGNAL TO THE BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 456 days.

(21) Appl. No.: 18/011,078

(22) PCT Filed: Jun. 19, 2020

(86) PCT No.: PCT/CN2020/097220
§ 371 (c)(1),
(2) Date: Dec. 16, 2022

(87) PCT Pub. No.: WO2021/253439
PCT Pub. Date: Dec. 23, 2021

(65) Prior Publication Data
US 2023/0247607 A1    Aug. 3, 2023

(51) Int. Cl.
*H04W 72/0453* (2023.01)
*H04B 7/06* (2006.01)
(Continued)

(52) U.S. Cl.
CPC ...... *H04W 72/0453* (2013.01); *H04B 7/0695* (2013.01); *H04L 5/0048* (2013.01);
(Continued)

(58) Field of Classification Search
CPC . H04W 72/0453; H04W 24/08; H04W 24/10; H04W 64/006; H04W 5/0048;
(Continued)

(56) References Cited

U.S. PATENT DOCUMENTS

2018/0049154 A1   2/2018   Choi et al.
2019/0215086 A1   7/2019   Kwak et al.
(Continued)

FOREIGN PATENT DOCUMENTS

CN   106851560 A   6/2017
CN   107786313 A   3/2018
(Continued)

OTHER PUBLICATIONS

CATT. "Design of CSI-RS for beam management" 3GPP TSG RAN WG1 NR Ad-Hoc #2 R1-1710066, Jun. 30, 2017 (Jun. 30, 2017), entire document.
(Continued)

*Primary Examiner* — Mewale A Ambaye
(74) *Attorney, Agent, or Firm* — Volpe Koenig (57) ABSTRACT

A radio access method includes: receiving a first reference signal transmitted by a first node by means of a first frequency resource, on the basis of the first reference signal, determining a line of sight of the first node; On the basis of the line of sight, determining a wave originating direction of the line of sight; in the wave originating direction, notifying the first node of an allocated second frequency resource by means of the first frequency resource; transmitting a second reference signal to the first node by means of the allocated second frequency resource; and receiving measurement information which is obtained by means of measurement and on the basis of the second reference signal and is reported by the first node by means of the first frequency resource or the second frequency resource.

17 Claims, 7 Drawing Sheets

(51) Int. Cl.
*H04L 5/00* (2006.01)
*H04W 24/08* (2009.01)
*H04W 24/10* (2009.01)
*H04W 64/00* (2009.01)

(52) U.S. Cl.
CPC .......... *H04W 24/08* (2013.01); *H04W 24/10* (2013.01); *H04W 64/006* (2013.01)

(58) Field of Classification Search
CPC ..... H04W 16/18; H04W 41/45; H04W 8/005; H04B 7/0695; Y02D 30/70
See application file for complete search history.

(56) References Cited

U.S. PATENT DOCUMENTS

| | | | | |
|---|---|---|---|---|
| 2022/0365163 | A1* | 11/2022 | Baek | H04W 4/40 |
| 2023/0194644 | A1* | 6/2023 | Lavin | G01S 3/043 |
| | | | | 342/442 |
| 2023/0262819 | A1* | 8/2023 | Karimidehkordi | H04B 7/088 |
| | | | | 370/329 |
| 2023/0319760 | A1* | 10/2023 | Raghavan | H04B 17/318 |
| | | | | 455/456.1 |
| 2024/0072849 | A1* | 2/2024 | Haija | H04B 7/0695 |

FOREIGN PATENT DOCUMENTS

| | | | |
|---|---|---|---|
| CN | 108156662 | * | 6/2018 |
| CN | 108156662 | A | 6/2018 |
| CN | 108282905 | A | 7/2018 |
| CN | 108633043 | A | 10/2018 |
| CN | 109787664 | A | 5/2019 |
| CN | 109842930 | A | 6/2019 |
| CN | 110574305 | A | 12/2019 |
| CN | 110740020 | A | 1/2020 |
| CN | 111278023 | A | 6/2020 |
| WO | 2018028549 | A1 | 2/2018 |
| WO | WO-2018126792 A1 | * | 7/2018 ........... H04B 17/345 |

OTHER PUBLICATIONS

International Search Report for PCT International Application No. PCT/CN2020/097220 issued in Feb. 25, 2021.

Huawei, HiSilicon, "Low frequency assisted high frequency operation", 3GPP TSG-RAN WG2 Meeting #96, R2-167878, Reno, Nevada, USA, Nov. 14-18, 2016.

Kazuaki Takeda. "New Radio (NR) Access Technology", 3GPP TSG RAN meeting #77, RP-171783, Sapporo, Japan, Sep. 11-14, 2017.

* cited by examiner

METHOD AND SYSTEM TO REPORT MEASUREMENT INFORMATION MEASURED BASED ON A REFERENCE SIGNAL TO THE BASE STATION

CROSS REFERENCE TO RELATED APPLICATION

The present application is a U.S. National Stage of International Application No. PCT/CN2020/097220, filed on Jun. 19, 2020, the entire content of which is incorporated herein by reference for all purposes.

BACKGROUND

With the development of mobile communication technologies, efforts have been made to develop an improved 5G or quasi-5G communication system in order to meet the requirements of a higher rate. Therefore, 5G or quasi-5G communication system is also referred to as an "ultra-4G network" or a "post-LTE system". The 5G communication system is considered to be implemented in higher frequency (mmWave) bands (such as 60 GHz) to achieve higher rates. To reduce propagation loss of radio waves and increase transmission distance, beamforming, massive multiple input multiple output (MIMO), full-dimension MIMO (FD-MIMO), array antenna, analog beamforming, and large antenna technologies have been discussed in the 5G communication system. In addition, in the 5G communication system, improvement and development of a system network based on advanced small cell, cloud radio access network (RAN), ultra-dense network, device-to-device (D2D) communication, radio backhaul, mobile network, cooperative communication, Coordinated Multiple Points (COMP), receiving end interference cancellation and the like is in progress. In the 5G system, hybrid frequency shift keying (FSK) and quadrature amplitude modulation (QAM) (FQAM) and sliding window superposition coding (SWSC) as advanced coded modulation (ACM), and filter bank multi-carrier (FBMC), non-orthogonal multiple access (NOMA), and space code multiple access (SCMA) as advanced access technologies and the like have been developed.

The mmWave has been introduced into the 5G NR communication, and a terahertz frequency band in predictable 6G communication will be widely applied.

SUMMARY

According to a first aspect of the present disclosure, there is provided a radio access method, including: receiving a first reference signal transmitted by a first node through a first frequency resource; notifying the first node of an allocated second frequency resource by means of the first frequency resource; transmitting a second reference signal to the first node by means of the allocated second frequency resource; and receiving measurement information, measured based on the second reference signal, reported by the first node through the second frequency resource.

According to a second aspect of the present disclosure, there is provided a radio access method, including: transmitting a first reference signal to a second node by means of a first frequency resource; receiving information of an allocated second frequency resource notified by the second node through the first frequency resource; receiving a second reference signal transmitted by the second node through the allocated second frequency resource; obtaining measurement information based on the second reference signal; and reporting the measurement information to the second node by means of the second frequency resource.

According to a third aspect of the present disclosure, there is provided a base station, including: a memory storing computer-executable instructions; and one or more processors coupled to the memory, and when the computer-executable instructions are executed by one or more processors, the methods of some of the above embodiments are implemented.

According to a fourth aspect of the present disclosure, there is provided a terminal, including: a memory storing computer-executable instructions; and one or more processors coupled to the memory, and when the computer-executable instructions are executed by one or more processors, the methods of some of the above embodiments are implemented.

According to a fifth aspect of the present disclosure, there is provided a non-transitory computer-readable storage medium, storing a computer program thereon, and when the computer program is executed by a processor, the method according to any of the above embodiments is implemented.

It shall be understood that the above general description and the following detailed description are only exemplary and explanatory, and cannot limit the present disclosure.

BRIEF DESCRIPTION OF THE DRAWINGS

The drawings here are incorporated into the specification and constitute a part of the specification, show the examples consistent with the present disclosure, and are used for explaining the principle of the present disclosure together with the specification.

The above drawings have shown clear embodiments of the present disclosure, and will be described in more detail hereinafter. These drawings and written descriptions are not intended to limit the scope of the present disclosure by any means, but rather to illustrate the concepts of the present disclosure to those skilled in the art by reference to specific embodiments.

DETAILED DESCRIPTION

The embodiments of the present disclosure are described in detail below. Examples of the embodiments are shown in the accompanying drawings, in which the same or similar reference numerals represent the same or similar elements with the same or similar functions. The embodiments described below with reference to the accompanying drawings are exemplary, and are used to explain the present disclosure and cannot be interpreted as a limitation on the present disclosure.

Those skilled in the art may understand that the singular forms "one", "one piece", "said" and "the" used here may also include the plural forms, unless specifically stated. It should be further understood that the terms "comprise/include" used in the specification of the present disclosure refers to the presence of the stated features, integers, steps, operations, units, and/or components, but do not exclude the presence or addition of one or more other features, integers, steps, operations, units and/or components, and/or combinations thereof. It should be understood that when it is said that an element is "connected" or "coupled" to another element, the element may be directly connected or coupled to other elements, or there may be intermediate elements. In addition, the "connected" or "coupled" used in the specification may include wireless connection or wireless coupling. The term "and/or" used herein includes all or any element and all combinations of one or more associated listed items.

The present disclosure relates to the field of a first node of mobile communication, and in particular to, a radio access method and system.

With the development of mobile communication technologies, efforts have been made to develop an improved 5G or quasi-5G communication system in order to meet the requirements of a higher rate. Therefore, 5G or quasi-5G communication system is also referred to as an "ultra-4G network" or a "post-LTE system". The 5G communication system is considered to be implemented in higher frequency (mmWave) bands (such as 60 GHz) to achieve higher rates. To reduce propagation loss of radio waves and increase transmission distance, beamforming, massive multiple input multiple output (MIMO), full-dimension MIMO (FD-MIMO), array antenna, analog beamforming, and large antenna technologies have been discussed in the 5G communication system. In addition, in the 5G communication system, improvement and development of a system network based on advanced small cell, cloud radio access network (RAN), ultra-dense network, device-to-device (D2D) communication, radio backhaul, mobile network, cooperative communication, Coordinated Multiple Points (COMP), receiving end interference cancellation and the like is in progress. In the 5G system, hybrid frequency shift keying (FSK) and quadrature amplitude modulation (QAM) (FQAM) and sliding window superposition coding (SWSC) as advanced coded modulation (ACM), and filter bank multi-carrier (FBMC), non-orthogonal multiple access (NOMA), and space code multiple access (SCMA) as advanced access technologies and the like have been developed.

The mmWave has been introduced into the 5G NR communication, and a terahertz frequency band in predictable 6G communication will be widely applied.

However, at high frequency, particularly in the terahertz frequency band, due to a large path loss, limited energy needs to be concentrated on a relatively narrow beam, and requirements for a channel are also relatively high. For example, a line of sight channel is better, while a non-line of sight channel is sharply worse. These features determine that a conventional access method cannot be used at high frequencies; otherwise, an access failure will be caused by a narrow beam, resulting in a long beam selection time or poor channel condition. A new radio access method and system is needed for the prominent problem of high-frequency mmWave and terahertz.

Figure 1:
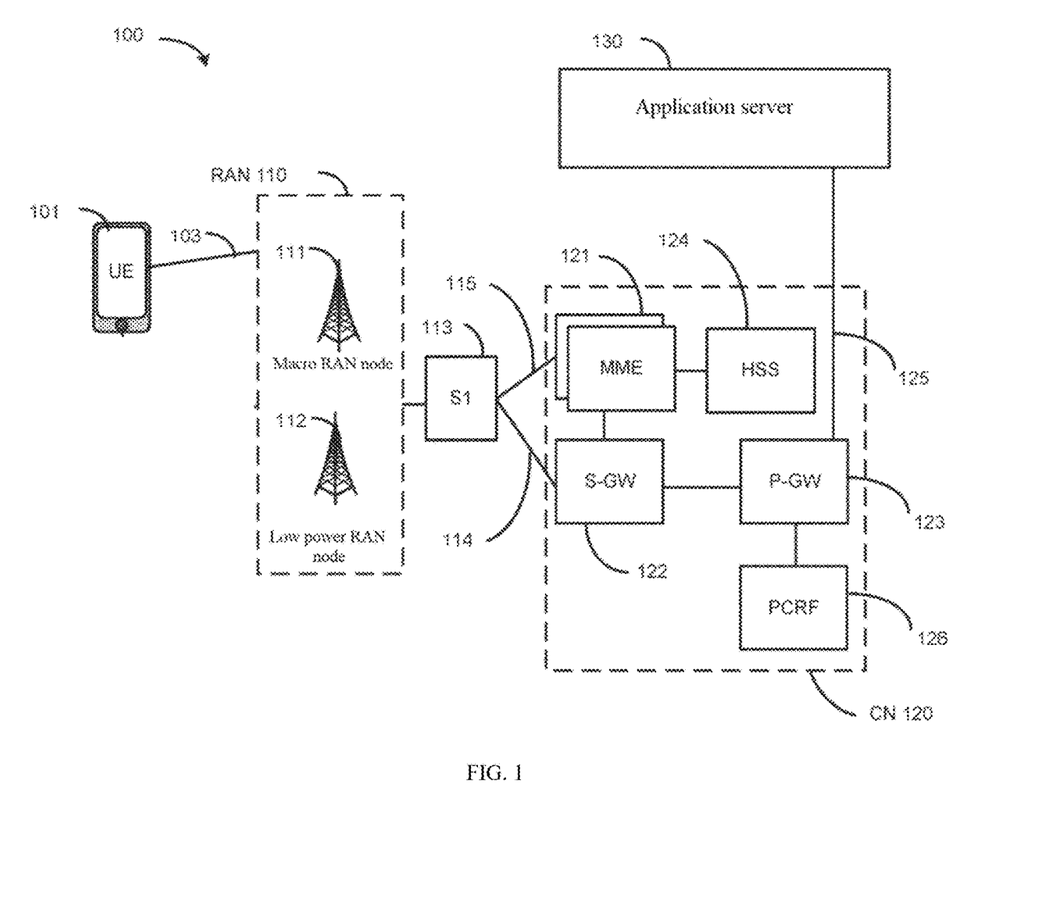
FIG. 1 is a block diagram of a radio network according to an embodiment of the present disclosure.

FIG. 1 is an architecture of a system 100 of a network according to an embodiment of the present disclosure. The system 100 is shown to include a handheld user equipment (UE) 101. The UE 101 is shown as a smartphone, but may also include any mobile or non-mobile computing device, such as a personal data assistant (PDA), a pager, a laptop computer, a desktop computer, a radio handheld device, or any computing device that includes a radio communication interface.

In some embodiments, the UE 101 may include Internet of Things (IoT), which may include network access layer designed for low power IoT applications that utilize short-term UE connections. IoT UE may utilize technologies such as machine to machine (M2M) or machine type communication (MTC) to exchange data with an MTC server or device via public land mobile network (PLMN), a proximity service (ProSe) or device-to-device (D2D) communication, a sensor network, or an IoT network. Data exchange of the M2M or MTC may be a machine-initiated data exchange. The IoT network describes interconnected IoT UE, which may include a uniquely identifiable embedded computing device (within an Internet infrastructure) with a short-term connection. The IoT UE may execute a background application to facilitate connections to the IoT network.

The UE 101 may be configured to connect with a radio access network (RAN) 110—which may be, for example, an evolved universal mobile telecommunications system (UMTS) terrestrial radio access network (E-UTRAN), Next-Gen RAN (NG RAN), or other types of RAN. The UE 101 utilizes a connection 103 that includes a physical communication interface or layer; in this example, the connection 103 is shown as an air interface for implementing communication coupling, and may comply with a cellular communication protocol such as Global System for Mobile Communications (GSM) protocol, Code Division Multiple Access (CDMA) network protocol, Push to Talk (PTT) protocol, PTT over Cellular (POC) protocol, Universal Mobile Telecommunications System (UMTS) protocol, 3GPP Long Term Evolution (LTE) protocol, the Fifth Generation (5G) protocol, and a new air interface (NR) protocol, etc.

In this embodiment, the UE 101 may further exchange communication data directly via a ProSe interface. The ProSe interface may alternatively be referred to as a sidelink interface that includes one or more logical channels including, but not limited to, a physical sidelink control channel (PSCCH), a physical sidelink shared channel (PSSCH), a physical sidelink discovery channel (PSDCH), and a physical sidelink broadcast channel (PSBCH).

The RAN 110 may include one or more access nodes enabling the connection 103. These access nodes (AN) may be referred to as base station (BS), NodeB, evolved NodeB (eNB), next generation NodeB (gNB), RAN node, etc., and may include a terrestrial station (e.g., a terrestrial access point) or a satellite station that provides coverage within a geographic area (e.g., a cell). The RAN 110 may include one or more RAN nodes (e.g., a macro RAN node 111) for providing a macro cell, and one or more RAN nodes (e.g., a low power (LP) RAN node 112) for providing a femto cell or pico cell (e.g., a cell having a smaller coverage area, smaller user capacity, or higher bandwidth than the macro cell).

Either one of the RAN nodes 111 and 112 may terminate the air interface protocol and may be a first contact point for the UE 101. In some embodiments, either of the RAN nodes 111 and 112 may perform various logical functions of RAN 110, including, but not limited to, radio network controller (RNC) functions such as radio bearer management, uplink and downlink dynamic radio resource management, and data packet scheduling, and mobility management.

According to some embodiments, the UE 101 may be configured to: in accordance with various communication technology (such as, but not limited to, orthogonal frequency division multiple access (OFDMA) communication technology (e.g., for downlink communications) or single carrier frequency division multiple access (SC-FDMA) communication technology (e.g., for uplink and ProSe, or sidelink communications)), communicate with each other or with either of the RAN nodes 111 and 112 by using an orthogonal frequency division multiplexing (OFDM) communication signal over a multi-carrier communication channel. However, the scope of the embodiments is not limited thereto. The OFDM signal may include multiple orthogonal subcarriers.

In some embodiments, a downlink resource grid may be used for downlink transmissions from either of RAN nodes 111 and 112 to UE 101, while uplink downlink transmissions may utilize similar technology. The grid may be a time-frequency grid called a resource grid or a time-frequency resource grid, which is a physical resource in each time slot in the downlink. Such a time-frequency plane representation is a common practice in OFDM systems, which makes radio resource allocation intuitive. Each column and each row of the resource grid corresponds to one OFDM symbol and one OFDM subcarrier, respectively. The duration of the resource grid in the time domain corresponds to one time slot in a radio frame. The smallest time frequency unit in the resource grid is referred to as a resource element. Each resource grid includes a plurality of resource blocks, which describe the mapping of certain physical channels to resource elements. Each resource block includes a set of resource elements; in the frequency domain, this way may represent the minimum amount of resources that can be allocated currently. Several different physical downlink channels are transmitted using such resource blocks.

The physical downlink shared channel (PDSCH) may carry user data and higher layer signaling to the UE 101. The physical downlink control channel (PDCCH) may carry information on transport format and resource allocation related to the PDSCH channel, etc. The PDCCH may further inform the UE 101 of transport format, resource allocation, and hybrid automatic repeat request (H-ARQ) information related to the uplink shared channel. In general, downlink scheduling (assigning control channel resource blocks and shared channel resource blocks to UEs 101 within a cell) may be performed at either of the RAN nodes 111 and 112 based on channel quality information fed back from any of the UEs 101. Downlink resource assignment information may be sent on the PDCCH for (for example, assigned to) each of the UE 101.

The PDCCH may use a control channel element (CCE) to convey control information.

PDCCH complex-valued symbols may first be organized into a quadruplet before being mapped to resource elements, and then may be arranged using a sub-block inter leaver for rate matching. Each PDCCH may be sent using one or more of these CCEs, where each CCE may correspond to nine groups of four physical resource elements referred to as resource element groups (REGs). Four quadrature phase shift keying (QPSK) symbols may be mapped to each REG. The PDCCH may be transmitting using one or more CCEs, depending on the size of downlink control information (DCI) and channel conditions. Four or more different PDCCH formats with different numbers of CCEs (e.g., aggregation level, L=1, 2, 4, or 8) may be defined in LTE.

Some embodiments may use concepts that are extensions of the above concepts for resource allocation for control channel information. For example, some embodiments may utilize an enhanced physical downlink control channel (EPDCCH) that uses a PDSCH resource for control information transmission. The EPDCCH may be transmitted using one or more enhanced control channel elements (ECCEs). Similar to above, each ECCE may correspond to nine groups of four physical resource elements referred to as enhanced resource element groups (EREGs). In some cases, the ECCE may have other numbers of EREGs.

The RAN 110 is shown to be coupled to a core network (CN) 620 in a communication manner via an S1 interface 113. In an embodiment, the CN120 may be an evolved packet core (EPC) network, a next generation packet core (NPC) network, or some other type of CN. In this embodiment, the S1 interface 113 is divided into two parts: S1-U interface 114, which carries transaction data between RAN nodes 111 and 112 and serving gateway (S-GW) 122; and an S1 mobility management entity (MME) interface 115, which is a signaling interface between the RAN nodes 111 and 112 and the MME 121.

In this embodiment, the CN 120 includes an MME 121, S-GW 122, a packet data network (PDN) gateway (P-GW) 123, and a home subscriber server (HSS) 124. The MME 121 may function similarly to a control plane of a legacy serving general packet radio service (GPRS) support node (SGSN). The MME 121 may manage mobility aspects in access, such as gateway selection and tracking area list management. The HSS 124 may include a database for network users, including subscription related information for supporting network entities to handle communication sessions. The CN 120 may include one or more HSSs 124, depending on the number of mobile subscribers, the capacity of the device, the organization of the network, etc. For example, the HSS 124 may provide support for routing/roaming, authentication, authorization, naming/addressing solutions, location dependencies, etc.

The S-GW 122 may terminate the S1 interface 113 to the RAN 110, and route data packets between the RAN 110 and the CN 120. In addition, the S-GW 122 may be a local mobility anchor for inter-RAN node handover and may also provide anchoring for inter-3GPP mobility. Other responsibilities may include legal interception, charging, and some policy enforcement.

The P-GW 123 may terminate to the SGi interface toward the PDN. The P-GW 123 may route data packets between the EPC network 123 and an external network, such as a network including application server 130 (alternatively referred to as application function (AF)), via an Internet protocol (IP) interface 125. The application server 130 may be an element that provides applications (e.g., UMTS packet service (PS) domain, LTE PS data service, etc.) to the core network that uses IP bearer resources. In this embodiment, the P-GW 123 is shown to be coupled to the application server 130 in a communication manner via an IP communication interface 125. The application server 130 may further be configured to support one or more communication services for the UE 101 via the CN 120.

The P-GW 123 may further be a node for policy enforcement and charging data collection. Policy and charging rules function (PCRF) 126 is a policy and charging control element of the CN 120. In a non-roaming scenario, there may be a single PCRF associated with an Internet protocol connectivity access network (IP-CAN) session of the UE in a home public land mobile network (HPLMN). In a roaming scenario where the traffic is away from the local, there may be two PCRFs associated with the IP-CAN session of the UE: a home PCRF (H-PCRF) within the HPLMN and a visited PCRF (V-PCRF) in a visited public land mobile network (VPLMN). The PCRF 126 may be coupled to the application server 130 in a communication manner via the P-GW 123. The application server 130 may signal the PCRF 126 to indicate a new service flow and select appropriate quality of service (QOS) and charging parameters. The PCRF 126 may provide the rules to a policy and charging enforcement function (PCEF) having an appropriate traffic flow template (TFT) and QoS class identifier (QCI), and the PCEF starts the QoS and charging specified by the application server 130.

Figure 2:
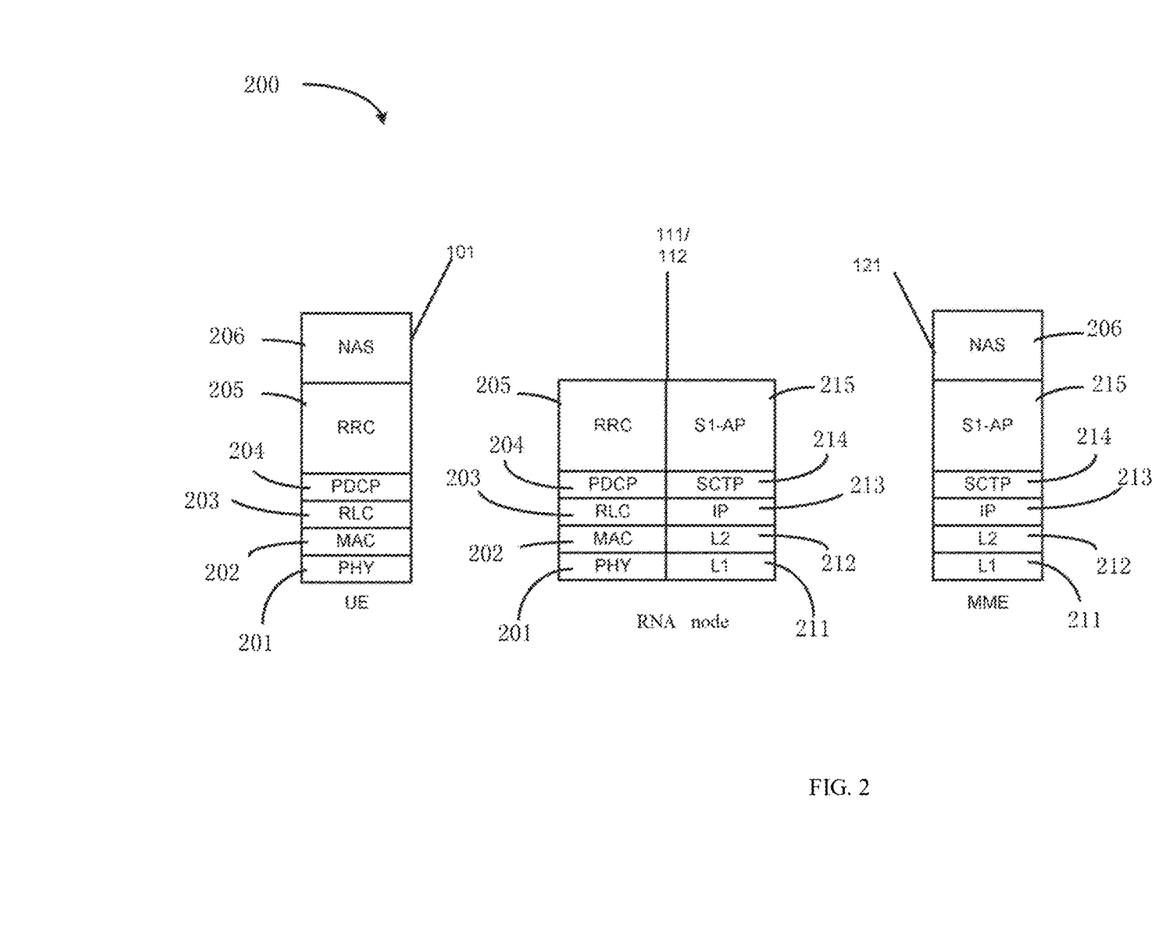
FIG. 2 is a schematic diagram of a control plane protocol stack according to an embodiment of the present disclosure.

FIG. 2 is a diagram of a control plane protocol stack according to an embodiment of the present disclosure. In this embodiment, a control plane 200 is shown as a communication protocol stack between the UE 101, the RAN node 111 (or the LP RAN node 112), and the MME 121.

A PHY layer 201 may send or receive information used by a MAC layer 202 through one or more air interfaces. The PHY layer 201 may further perform link adaptation or adaptive modulation and coding (AMC), power control, cell search, and other measurements used by higher layers such as an RRC layer 205. The PHY layer 201 may still further perform error detection for a transport channel, forward error correction (FEC) encoding/decoding for the transport channel, modulation/demodulation for the physical channel, interleaving, rate matching, mapping to the physical channel, and multiple input multiple output (MIMO) antenna processing.

An MAC layer 202 may perform mapping between logical channels and the transport channels, multiplexing MAC service data units (SDU) from one or more logical channels to transport blocks (TBs) for delivery to the PHY layer 201 via the transport channels, demultiplexing MAC SDU from transport blocks (TBs) delivered from the PHY layer 201 via transport channels to one or more logical channels, multiplexing MAC SDU to TBs, reporting scheduling information, performing error correction by means of hybrid automatic repeat request (HARQ), and sorting logical channel priorities.

An RLC layer 203 may operate in a variety of modes of operation, including: transparent mode (TM), unacknowledged mode (UM), and acknowledged mode (AM). The RLC layer 203 may perform transmission of upper layer protocol data units (PDUs), error correction through automatic repeat request (ARQ) for AM data transmission, and concatenation, segmentation, and reassembly of RLC SDUs for UM and AM data transmission. The RLC layer 203 may further perform re-segmentation of RLC data PDUs for AM data transmission, reordering RLC data PDUs for UM and AM data transmission, detecting duplicate data for UM and AM data transmission, discarding RLC SDUs for UM and AM data transmission, detecting protocol errors for AM data transmission, and performing RLC reconstruction.

A PDCP layer 204 may perform header compression and decompression of IP data, maintain a PDCP sequence number (SN), perform sequential transmission of upper layer PDU when re-establishing a lower layer. When the lower layer is re-established, eliminating duplication of an SDU of the lower layer for a radio bearer mapped on an RLC AM, encrypting and decrypting control plane data, performing integrity protection and integrity verification of control plane data, controlling timer-based data discard, and performing a security operation.

The primary services and functions of the RRC layer 205 may include broadcasting of system information (e.g., included in a master information block (MIB) or system information block (SIB) related to a non-access stratum (NAS)), broadcasting of system information related to an access stratum (AS), paging, establishment, maintenance, and release of an RRC connection between a UE and an E-UTRAN (e.g., RRC connection paging, RRC connection establishment, RRC connection modification and RRC connection release), establishment, configuration, maintenance and release of a point-to-point radio bearer, security function, inter radio access technology (Inter-RAT) mobility and measurement configuration for UE measurement reporting. The MIB and SIB may include one or more information elements (IEs), and each IE may include a separate data field or data structure.

The UE 101 and the RAN node 111 may utilize a Uu interface (e.g., an LTE-Uu interface) to exchange control plane data via a protocol stack (including the PHY layer 201, the MAC layer 202, the RLC layer 203, the PDCP layer 204, and the RRC layer 205).

In the illustrated embodiment, the non-access stratum (NAS) 206 forms the highest layer of the control plane between the UE 101 and the MME 121. The NAS protocol 206 supports mobility and session management procedures for the UE 101 to establish and maintain an IP connection between the UE 101 and the P-GW 123.

The S1 application protocol (S1-AP) layer 215 may support the function of the S1 interface and include an elementary procedure (EP). The EP is a unit of interaction between the RAN node 111 and the CN 120. The S1-AP layer service may include two groups: a UE associated service and a non-UE associated service. These services perform the following functions including, but not limited to, E-UTRAN radio access bearer (E-RAB) management, UE capability indication, mobility, NAS signaling transport, RAN information management (RIM), and configuration transfer.

Stream control transmission protocol (SCTP) layer 214 may ensure a reliable transfer of signaling messages between the RAN node 111 and the MME 121, based in part on the IP protocols supported by the IP layer 213. L2 layer 212 and L1 layer 211 may refer to communication links used by RAN nodes and MMEs to exchange information.

The RAN node 111 and the MME 121 may utilize an S1-MME interface to exchange control plane data via a protocol stack, including L1 layer 211, L2 layer 212, IP layer 213, SCTP layer 214, and S1-AP layer 215.

Figure 3:
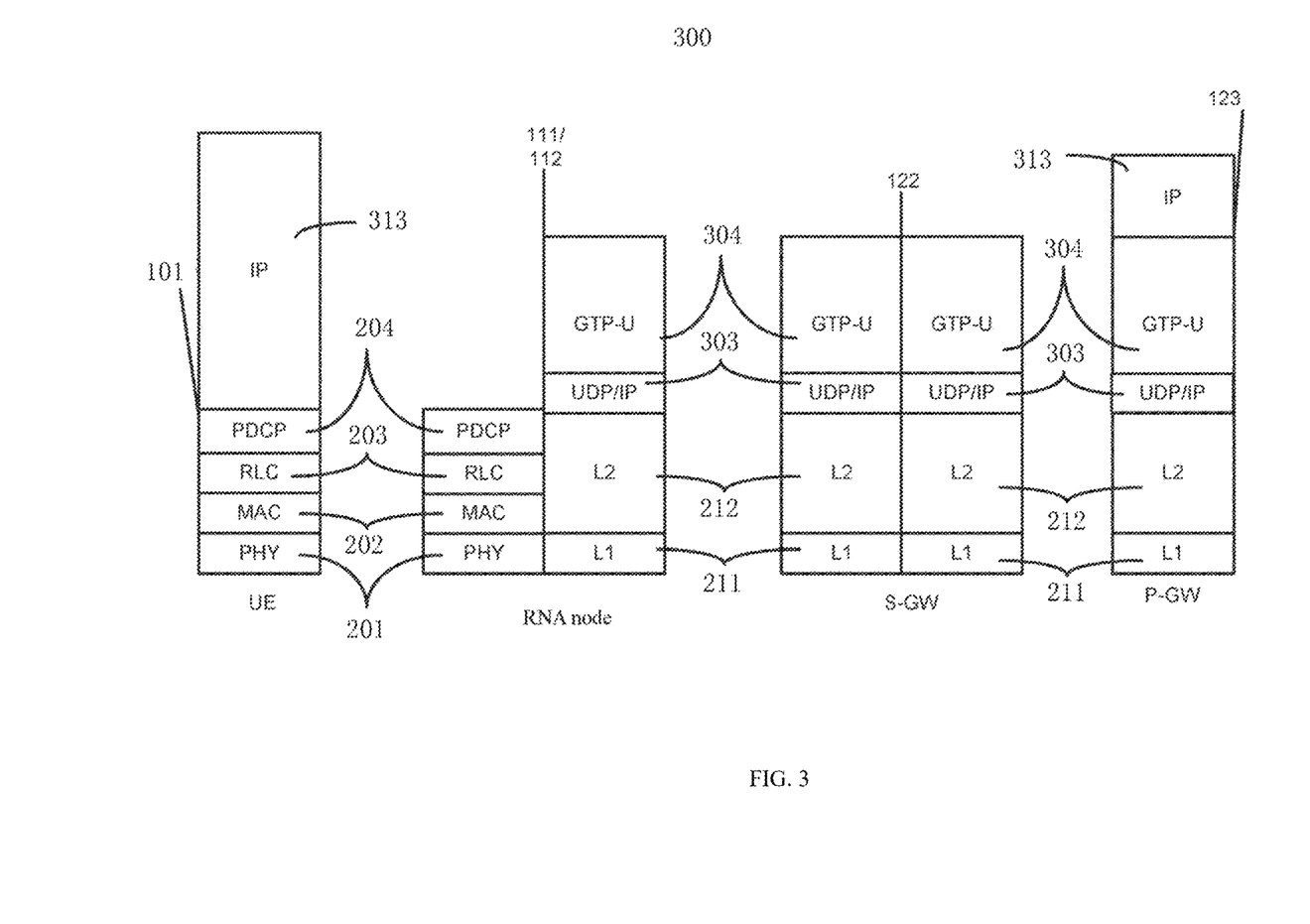
FIG. 3 is a schematic diagram of a user plane protocol stack according to an embodiment of the present disclosure.

FIG. 3 is a diagram of a user plane protocol stack according to an embodiment of the present disclosure. In this embodiment, a user control plane 300 is shown as a communication protocol stack between the UE 101, the RAN node 111 (or the LP RAN node 112), the S-GW 122, and the P-GW 123. The user plane 300 may utilize at least some of the same protocol layers as the control plane 200. For example, the UE 101 and the RAN node 111 may utilize a Uu interface (e.g., a LTE-Uu interface) to exchange user plane data via a protocol stack, including PHY layer 201, MAC layer 202, RLC layer 203, and PDCP layer 204.

A general packet radio service (GPRS) tunneling protocol for the user plane (GTP-U) layer 304 may be used to carry user data within the GPRS core network and between the radio access network and the core network. For example, the transmitted user data may be packets in any of IPV4, IPv6, or PPP formats. The UDP and IP security (UDP/IP) layer 303 may provide checksums for data integrity, port numbers for addressing different functions at the source and destination, and encryption and authentication of selected data streams. The RAN node 111 and the S-GW 122 may utilize an S1-U interface to exchange user plane data via the protocol stack, including L1 layer 211, L2 layer 212, UDP/

IP layer 303, and GTP-U layer 304. The S-GW 122 and P-GW 123 may utilize an S5/S8a interface to exchange user plane data via the protocol stack, including L1 layer 211, L2 layer 212, UDP/IP layer 303, GTP-U layer 304, and IP layer 313. As discussed above with respect to FIG. 2, the NAS protocol supports mobility and session management procedures of the UE 101 to establish and maintain an IP connection between the UE 101 and the P-GW 123.

Figure 4:
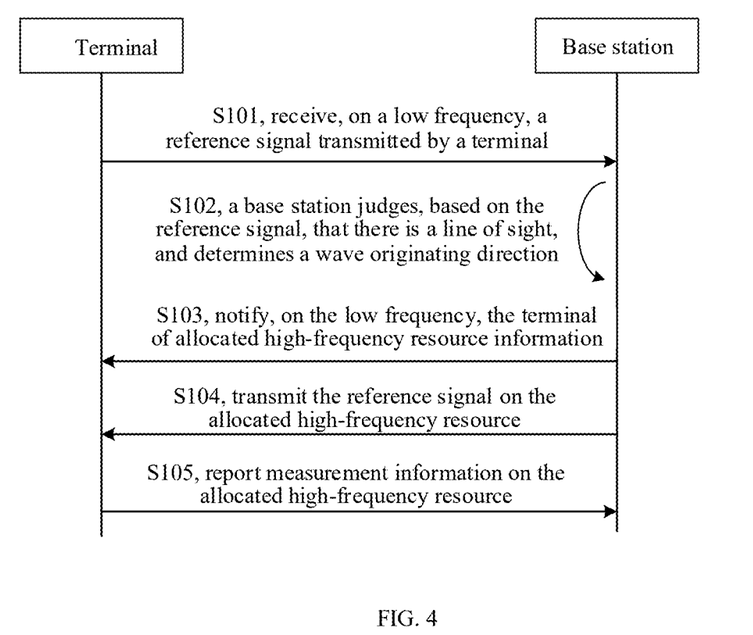
FIG. 4 is a schematic flowchart of a radio access method according to an embodiment of the present disclosure.

FIG. 4 is a schematic flowchart of a radio access method for a base station according to an embodiment of the present disclosure. The radio access method includes: in step S101, the base station receives a reference signal transmitted by a terminal on a low frequency. In step S102, the base station judges whether there is a line of sight with the terminal side based on the received reference signal. In response to determining there is a line of sight, a wave originating direction of the line of sight is determined. In step S103, the terminal is notified of allocated high-frequency resource information on the low frequency. For example, the base station notifies the terminal of the allocated high-frequency resource information on the established low frequency band. In step S104, a reference signal is transmitted on the allocated high-frequency resource. For example, the base station transmits a reference signal to the terminal on a beam or a beam group where the wave originating direction along the line of sight is located on the allocated time slot. In step S105, the receiving terminal reports measurement information measured based on the reference signal through the high-frequency resource. For example, the terminal performs beam management and selects a suitable beam for communication, and the base station receives a first reference signal transmitted by the terminal through the low-frequency resource.

In an embodiment of the present disclosure, the low-frequency resource may be a frequency below 10 GHz, and the high-frequency resource may be a mm Wave frequency band or a terahertz frequency band.

In another embodiment of the present disclosure, the low frequency resource may be a mm Wave frequency band, and the high frequency resource may be a higher mmWave frequency band or a terahertz frequency band.

In addition, in an embodiment of the present disclosure, the terminal may also report the measurement information measured based on a reference signal to the base station via the low-frequency resource.

According to an embodiment of the present disclosure, a terminal periodically transmits a reference signal to a base station, the base station judges whether a line of sight exists with a terminal side based on the received reference signal, and the base station marks all terminals having a line of sight as a resource pool. When a terminal in the resource pool needs to transmit a large amount of data, the base station notifies the terminal of the allocated high-frequency resource information on the low-frequency band.

In another embodiment, when determining the resource pool, in addition to judging whether there is a line of sight, the base station also needs to judge whether the movement speed of the terminal is less than a certain threshold. It is determined that the movement speed of the terminal is greater than the threshold, even in response to determining the terminal has a line of sight, the terminal is still not included in the resource pool.

According to an embodiment of the present disclosure, a method for a base station to obtain a movement speed of a terminal may be judged based on the reporting of the terminal or based on that a reference signal received power (RSRP) variation range of a reference signal within a certain time is less than a certain threshold.

According to an embodiment of the present disclosure, when the terminal sends a reference signal to a base station in a triggered manner, the event may be transmitted based on whether the terminal needs a large amount of data. In response to determining the amount of data to be transmitted is larger than a certain preset value or the service type requires a large amount of real-time data transmission, then the terminal sends the reference signal to the base station in a triggered manner.

In an embodiment, the base station may perform channel estimation by receiving a reference signal and a local signal, and determine whether a line of sight exists through an energy window function; or determine whether a line of sight exists by directly measuring a received signal strength indication (RSSI) of the reference signal. And the base station may calculate a wave originating direction of the line of sight by estimating an angle of the line of sight based on the antenna array.

In an embodiment, the base station determines the high-frequency resource information allocated to the terminal based on the capability reported by the terminal, the traffic of the terminal, and the situation of high-frequency idle resources.

According to an embodiment of the present disclosure, the base station selects, based on the measurement information reported by the terminal, an optimal beam from a beam or a beam group to communicate with the terminal.

In an embodiment of the present disclosure, the base station may determine a reference beam where a high frequency is located based on a wave originating direction. The terminal selects, based on the reference beam, the one or more beams of the wave originating direction to transmit the second reference signal.

In an embodiment, in order to ensure that the terminal can select an optimal beam in a beam management process, a base station may need to transmit the reference signal in turn on a beam group formed by a plurality of beams. The number of beams in the beam group may be determined depending on the frequency information of a low frequency and the frequency information of a high frequency, or the frequency ratio information of the low frequency and the high frequency.

In an embodiment, it can be shown in the following Table 1, where a, b, and c are preset values.

TABLE 1

| determine the number of beams in a beam group | |
|---|---|
| Ratio F of high frequency/<br>low frequency | Number of beams in a beam group |
| F ≤ a | 2 |
| a ≤ F ≤ b | 4 |
| b ≤ F ≤ c | 8 |
| F > c | 16 |

As shown in Table 1, in response to determining the ratio F of high frequency/low frequency is less than or equal to a, the number of beams in a beam group is 2; in response to determining the ratio F of high frequency/low frequency is greater than or equal to a, and less than or equal to b, the number of beams in a beam group is 4; in response to determining the ratio F of high frequency/low frequency is greater than or equal to b, and less than or equal to c, the number of beams in a beam group is 8; and in response to determining the ratio F of high frequency/low frequency is greater than c, the number of beams in a beam group is 16.

According to another embodiment of the present disclosure, the number of beams in a beam group may also be as shown in the following Table 2, where a, b, and X1, X2, X3 are preset values. The data in the table is used as an example only.

TABLE 2 determine the number of beams in a beam group

| Low frequency point F | Number of beams in a beam group |
| --- | --- |
| F ≤ a | 8 (high frequency > X1) |
|  | 16 (high frequency > X2) |
|  | 32 (high frequency > X3) |
| a ≤ F ≤ b | 4 (high frequency > X1) |
|  | 8 (high frequency > X2) |
|  | 16 (high frequency > X3) |
| F > b | 2 (high frequency > X1) |
|  | 4 (high frequency > X2) |
|  | 8 (high frequency > X3) |

In an embodiment of the present disclosure, the terminal performs beam scanning on each beam on the beam group based on a conventional beam management step on the received high frequency resources to determine an optimal beam.

In another embodiment of the present disclosure, the base station transmits a reference signal, which may be a synchronization signal (SS), to the terminal on a beam or a beam group where the wave originating direction of the line of sight is located on the allocated time slot.

In addition, the above method is suitable not only for communication between a terminal and a base station, but also for communication between any two nodes. For example, the direct communication between terminals, may also utilize the method to access on a high frequency carrier on a supported high and low frequency terminals.

Figure 5:
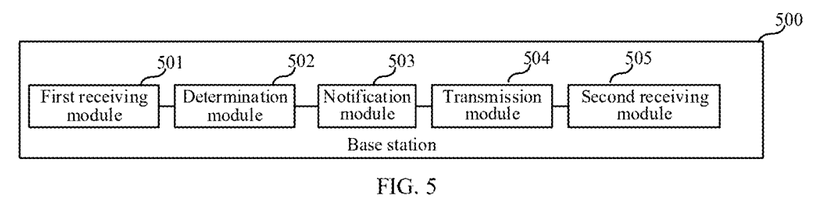
FIG. 5 is a schematic structural diagram of a base station according to an embodiment of the present disclosure.

FIG. 5 is a schematic structural diagram of a base station 500. As shown in FIG. 5, the base station 500 includes: a first receiving module 501 configured to receive a first reference signal transmitted by a terminal through a low-frequency resource; a determination module 502 configured to determine a line of sight of the terminal based on the first reference signal; a notification module 503 configured to notify the terminal of an allocated high-frequency resource through the low-frequency resource; a transmission module 504 configured to transmit a second reference signal to the terminal through the allocated high-frequency resource along the line of sight; and a second receiving module 505 configured to receive measurement information, measured based on the second reference signal, reported by the terminal through the high-frequency resource.

In an embodiment of the present disclosure, the base station 500 may be any node.

In another embodiment of the present disclosure, the transmission module 504 is further configured to transmit the second reference signal to the terminal through the allocated second frequency resource on one or more beams in a wave originating direction.

In an embodiment of the present disclosure, the base station 500 further includes a selection module configured to select an optimal beam from one or more beams to communicate with the terminal based on the measurement information reported by the terminal.

In an embodiment of the present disclosure, the selection module is further configured to determine a reference beam for communication via a second frequency resource based on the wave originating direction; and select, based on the reference beam, one or more beams of the wave originating direction to transmit the second reference signal.

Figure 6:
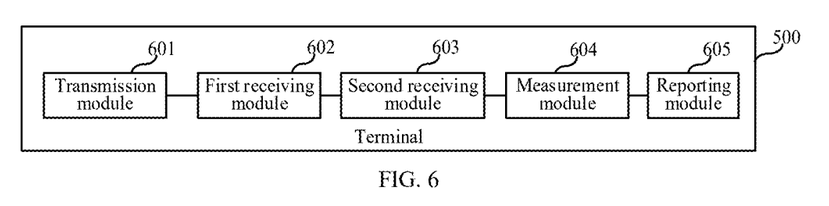
FIG. 6 is a schematic structural diagram of a terminal according to an embodiment of the present disclosure.

FIG. 6 is a schematic structural diagram of a terminal 600. As shown in FIG. 6, the terminal 600 includes: a transmission module 601 configured to transmit a first reference signal to a base station through a low-frequency resource; a first receiving module 602 configured to receive information of an allocated high-frequency resource notified by the base station through the low-frequency resource; a second receiving module 603 configured to receive a second reference signal transmitted by the base station through the allocated high-frequency resource along a line of sight of the terminal determined based on the first reference signal; a measurement module 604 configured to obtain measurement information based on the second reference signal; and a reporting module 605 configured to report the measurement information to the base station through the high-frequency resource.

According to an embodiment of the present disclosure, the terminal 600 may transmit the first reference signal to the base station in a triggered manner by means of the low-frequency resource, which includes: in response to the terminal 600 needing to transmit a predetermined amount of data, transmitting the first reference signal in a triggered manner.

In addition, in an embodiment of the present disclosure, the terminal 600 may be any node.

In an embodiment of the present disclosure, the second receiving module 602 is further configured to receive a second reference signal transmitted by the base station through the allocated second frequency resource along a line of sight of the terminal determined based on the first reference signal;

In an embodiment of the present disclosure, the transmission module 601 is further configured to transmit a first reference signal to the base station in a periodical or triggered manner by means of a first frequency resource.

In an embodiment of the present disclosure, the transmission module 601 is further configured to transmit, in response to the terminal needing to transmit a threshold amount of data, the first reference signal in a triggered manner.

In an embodiment of the present disclosure, the first receiving module 602 is further configured to receive, on one or more beams of a wave destination direction of a line of sight of the terminal, a second reference signal transmitted by the base station through the allocated second frequency resource.

Figure 7:
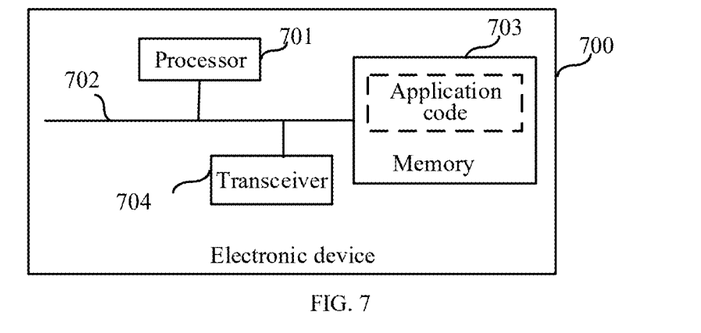
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device 700 includes: a processor 701, and a memory 703. The processor 701 and the memory 703 are connected, such as through a bus 702. Further, the electronic device 700 may include a transceiver 704. It may be noted that in actual application, the transceiver 704 is not limited to one, and the structure of the electronic device 700 does not limit the embodiments of the present disclosure.

The processor 701 is applied to the embodiments of the present disclosure, and is configured to implement the functions of the various modules shown in FIG. 5 and may also implement the functions of the various modules shown in FIG. 6. The transceiver 704 includes a receiver and a transmitter. The transceiver 704 is applied to the embodiments of the present disclosure and is configured to implement a transceiving function.

The processor 701 may be a CPU, a general processor, a DSP, an ASIC, an FPGA, or other programmable logic device, a transistor logic device, a hardware component, or any combination thereof. The processor 701 may realize or execute various exemplary logical blocks, modules, and circuits described in combination with the contents disclosed by the present disclosure. The processor 701 may also be a combination for realizing calculation functions, for example, the processor 701 may include one or more microprocessor combinations, a combination of a DSP and a microprocessor, etc.

The bus 702 may include a path that transfers information between the above components. The bus 702 may be a PCI bus, an EISA bus, or the like. The bus 702 may be divided into an address bus, a data bus, a control bus, etc. For ease of representation, only one thick line is shown in FIG. 7, but it does not indicate that there is only one bus or one type of bus.

The memory 703 may be, but is not limited to, an ROM or other types of static storage devices that may store static information and instructions, RAM, or other types of dynamic storage devices that may store information and instructions, or EEPROM, CD-ROM or other optical disk storage, optical disk storage (including compact discs, laser disc, optical disc, digital versatile disc, Blu-ray disc, etc.), magnetic disk storage media or other magnetic storage devices, or any other medium that can be used to carry or store desired program code in the form of instructions or data structures and that can be accessed by a computer.

The memory 703 is configured to store an application program code for executing the solution of the present disclosure, and the execution is controlled by the processor 701. The processor 701 is configured to execute an application program code stored in the memory 703, to implement an action of the base station provided in the embodiment shown in FIG. 5 or an action of the terminal shown in FIG. 6.

Embodiments of the present disclosure provide a non-transitory computer-readable storage medium, storing a computer program thereon. When a processor executes the program, the method shown in the above embodiments is implemented.

It would be easy for those skilled in the art to conceive of another example of the disclosure upon consideration of the specification and practice of the disclosure. This application is intended to cover any variation, use, or adaptation of the disclosure, and these variations, uses, or adaptations follow the general principles of the disclosure and include common general knowledge or customary technical means in the art that are not disclosed in the disclosure. The specification and examples are considered as exemplary only, and the true scope and spirit of the disclosure is indicated by the following claims.

It should be understood that the present disclosure is not limited to the precise structure described above and shown in the drawings, and various modifications and changes can be made without departing from its scope. The scope of the present disclosure is only limited by the appended claims.

The purpose of the embodiments of the present disclosure is to solve at least one of the above technical defects, and the following technical solutions are proposed:

According to a first aspect of the present disclosure, there is provided a radio access method, including: receiving a first reference signal transmitted by a first node through a first frequency resource; notifying the first node of an allocated second frequency resource by means of the first frequency resource; transmitting a second reference signal to the first node by means of the allocated second frequency resource; and receiving measurement information, measured based on the second reference signal, reported by the first node through the second frequency resource.

According to an embodiment of the present disclosure, the method further includes: determining a line of sight of the first node based the first reference signal; and transmitting a second reference signal to the first node through the allocated second frequency resource includes: transmitting the second reference signal to the first node through the allocated second frequency resource along the line of sight.

According to an embodiment of the present disclosure, the method further includes: determining a line of sight of the first node includes: determining a wave originating direction of the line of sight; and transmitting the second reference signal to the first node through the allocated second frequency resource along the line of sight includes: on one or more beams in the wave originating direction, transmitting the second reference signal to the first node by means the allocated second frequency resource.

According to an embodiment of the present disclosure, the method further includes: selecting a beam from one or more beams to communicate with the first node based on the reported measurement information.

According to an embodiment of the present disclosure, the method further includes: determining a reference beam for communication based on a second frequency resource based on the wave originating direction; and selecting one or more beams of the wave originating direction to transmit the second reference signal based on the reference beam.

According to an embodiment of the present disclosure, notifying the first node of an allocated second frequency resource by means of the first frequency resource includes: in response to the first node having the line of sight, marking the first node as a resource pool; and in response to detecting that the number of data to be transmitted by the first node marked as the resource pool exceeds a threshold amount, the first node is notified of the allocated second frequency resource.

According to an embodiment of the present disclosure, the method further includes: determining a movement speed of the first node; and in response to the movement speed of the first node is greater than a speed threshold, the first node is not marked into the resource pool.

According to an embodiment of the present disclosure, determining a movement speed of the first node includes any one of the following: determining the movement speed based on the first reference signal transmitted by the first node; and determining the movement speed based on a reference signal received power (RSRP) variation range of the first reference signal transmitted by the first node within a predetermined time interval.

According to an embodiment of the present disclosure, receiving a first reference signal transmitted by a first node through a first frequency resource includes: receiving the first reference signal transmitted by the first node through the first frequency resource in a periodical or triggered manner.

According to an embodiment of the present disclosure, determining a line of sight of the first node based on the first reference signal includes: determining, based on an energy window function or measuring a received signal strength indication (RSSI) of the first reference signal, the line of sight of the first node.

According to an embodiment of the present disclosure, determining a wave originating direction of the line of sight includes: calculating and determining, based on an angle of an antenna array relative to the line of sight, the wave originating direction of the line of sight.

According to an embodiment of the present disclosure, the second frequency resource allocated to the first node is determined based on at least one of the following: reporting capability of the first node, traffic of the first node, and situation of high-frequency idle resources.

According to a second aspect of the present disclosure, there is provided a radio access method, including: transmitting a first reference signal to a second node by means of a first frequency resource; receiving information of an allocated second frequency resource notified by the second node through the first frequency resource; receiving a second reference signal transmitted by the second node through the allocated second frequency resource; obtaining measurement information based on the second reference signal; and reporting the measurement information to the second node by means of the second frequency resource.

According to an embodiment of the present disclosure, receiving a second reference signal transmitted by the second node through the allocated second frequency resource includes: receiving a second reference signal transmitted by the second node through the allocated second frequency resource along a line of sight of the first node determined based on the first reference signal.

According to an embodiment of the present disclosure, transmitting a first reference signal to a second node by means of a first frequency resource includes: transmitting a first reference signal to a second node in a periodical or triggered manner by means of a first frequency resource.

According to an embodiment of the present disclosure, transmitting the first reference signal to the second node in a triggered manner by means of the first frequency resource includes: in response to the first node needing to transmit a threshold amount of data, transmitting the first reference signal in a triggered manner.

According to an embodiment of the present disclosure, receiving a second reference signal transmitted by the second node through the allocated second frequency resource includes: receiving, on one or more beams of a wave destination direction of a line of sight of the first node, a second reference signal transmitted by the second node through the allocated second frequency resource.

According to a third aspect of the present disclosure, there is provided a base station, including: a first receiving module configured to receive a first reference signal transmitted by a terminal through a first frequency resource; a determination module configured to determine a line of sight of the terminal based on the first reference signal; a notification module configured to notify the terminal of an allocated second frequency resource through the first frequency resource; a transmission module configured to transmit a second reference signal to the terminal through the allocated second frequency resource along the line of sight; and a second receiving module configured to receive measurement information, measured based on the second reference signal, reported by the terminal through the second frequency resource.

According to a fourth aspect of the present disclosure, there is provided a base station, including: a memory storing computer-executable instructions; and one or more processors coupled to the memory, and when the computer-executable instructions are executed by one or more processors, the methods of some of the above embodiments are implemented.

According to a fifth aspect of the present disclosure, there is provided a terminal, including: a transmission module configured to transmit a first reference signal to a base station through a first frequency resource; a first receiving module configured to receive information of an allocated second frequency resource notified by the base station through the first frequency resource; a second receiving module configured to receive a second reference signal transmitted by the base station through the allocated second frequency resource along a line of sight of the terminal determined based on the first reference signal; a measurement module configured to obtain measurement information based on the second reference signal; and a reporting module configured to report the measurement information to the base station by means of the second frequency resource.

According to a sixth aspect of the present disclosure, there is provided a terminal, including: a memory storing computer-executable instructions; and one or more processors coupled to the memory, and when the computer-executable instructions are executed by one or more processors, the methods of some of the above embodiments are implemented.

According to a seventh aspect of the present disclosure, there is provided a non-transitory computer-readable storage medium, storing a computer program thereon, and when the program is executed by a processor, the method in any of the above embodiments are implemented.

According to the radio access method proposed in the present disclosure, based on a solution of firstly performing a pre-judgement on a low frequency and then determining a high frequency access, not only the success rate of access is improved, but also the access delay can be greatly shortened, thereby ensuring the performance of high frequency communication.

What is claimed is:

1. A radio access method, comprising:
   receiving a first reference signal transmitted by a first node through a first frequency resource;
   determining a line of sight with the first node based on the first reference signal;
   establishing communication with the first node by means of an allocated second frequency resource based on the line of sight;
   determining a wave originating direction along the line of sight;
   notifying the first node of the allocated second frequency resource by means of the first frequency resource, based on the wave originating direction;
   transmitting a second reference signal to the first node by means of the allocated second frequency resource; and
   receiving measurement information, measured based on the second reference signal, reported by the first node through the first frequency resource or the allocated second frequency resource.

2. The method according to claim 1, wherein the first frequency resource is a lower frequency than the allocated second frequency resource.

3. The method according to claim 1, wherein transmitting the second reference signal to the first node by means of the allocated second frequency resource along the line of sight comprises:
   on one or more beams in the wave originating direction, transmitting the second reference signal to the first node by means the allocated second frequency resource.

4. The method according to claim 3, further comprising:
   selecting a beam from one or more beams to communicate with the first node based on the measurement information.

5. The method according to claim 3, further comprising:
determining a reference beam for communication through the allocated second frequency resource based on the wave originating direction; and
selecting the one or more beams of the wave originating direction to transmit the second reference signal based on the reference beam.

6. The method according to claim 1, wherein notifying the first node of the allocated second frequency resource by means of the first frequency resource comprises:
in response to the first node having the line of sight, marking the first node as a resource pool; and
in response to detecting a number of data to be transmitted by the first node marked as the resource pool exceeds a threshold amount, the first node is notified of the allocated second frequency resource.

7. The method according to claim 1, further comprising:
determining a movement speed of the first node based on the first reference signal; and
in response to the movement speed of the first node being greater than a speed threshold, the first node being not marked into a resource pool.

8. The method according to claim 7, wherein determining the movement speed of the first node further comprises:
determining the movement speed based on a reference signal received power (RSRP) variation range of the first reference signal transmitted by the first node within a first time interval.

9. The method according to claim 1, wherein receiving the first reference signal transmitted by the first node through the first frequency resource comprises:
receiving the first reference signal transmitted by the first node through the first frequency resource in a periodical manner or a triggered manner.

10. The method according to claim 1, wherein determining the line of sight with the first node based on the first reference signal comprises:
determining, based on an energy window function or measuring a received signal strength indication (RSSI) of the first reference signal, the line of sight with the first node.

11. The method according to claim 1, wherein determining the wave originating direction of the line of sight comprises:
calculating and determining, based on an angle of an antenna array relative to the line of sight, the wave originating direction of the line of sight.

12. The method according to claim 3, wherein the number of one or more beams is determined based on a ratio of the allocated second frequency resource to the first frequency resource or frequency information of the allocated second frequency resource and frequency information of the first frequency resource.

13. A radio access method, comprising:
transmitting a first reference signal to a second node by means of a first frequency resource;
receiving information of an allocated second frequency resource notified by the second node through the first frequency resource;
receiving a second reference signal transmitted by the second node through the allocated second frequency resource;
obtaining measurement information based on the second reference signal; and
reporting the measurement information to the second node by means of the allocated second frequency resource;
wherein receiving the second reference signal transmitted by the second node through the allocated second frequency resource comprises:
receiving the second reference signal transmitted by the second node through the allocated second frequency resource along a line of sight with a first node determined based on the first reference signal.

14. The method according to claim 13, wherein transmitting the first reference signal to the second node by means of the first frequency resource comprises:
transmitting the first reference signal to the second node in a periodical manner or a triggered manner by means of the first frequency resource.

15. The method according to claim 14, wherein transmitting the first reference signal to the second node in the triggered manner by means of the first frequency resource comprises:
in response to the first node needing to transmit a threshold amount of data, transmitting the first reference signal in the triggered manner.

16. The method according to claim 13, wherein receiving the second reference signal transmitted by the second node through the allocated second frequency resource comprises:
receiving, on one or more beams of a wave destination direction of the line of sight with the first node, the second reference signal transmitted by the second node through the allocated second frequency resource.

17. A terminal, comprising:
a memory storing computer-executable instructions; and
one or more processors coupled to the memory, and when the computer-executable instructions are executed by one or more processors, implement:
transmitting a first reference signal to a second node by means of a first frequency resource;
receiving information of an allocated second frequency resource notified by the second node through the first frequency resource;
receiving a second reference signal transmitted by the second node through the allocated second frequency resource;
obtaining measurement information based on the second reference signal; and
reporting the measurement information to the second node by means of the allocated second frequency resource;
wherein receiving the second reference signal transmitted by the second node through the allocated second frequency resource comprises:
receiving the second reference signal transmitted by the second node through the allocated second frequency resource along a line of sight with the first node determined based on the first reference signal.

* * * * *